Dec. 19, 1933.    F. C. NARVESEN ET AL    1,939,825
GYROSCOPIC HORIZON INDICATOR
Filed April 2, 1931    2 Sheets-Sheet 1
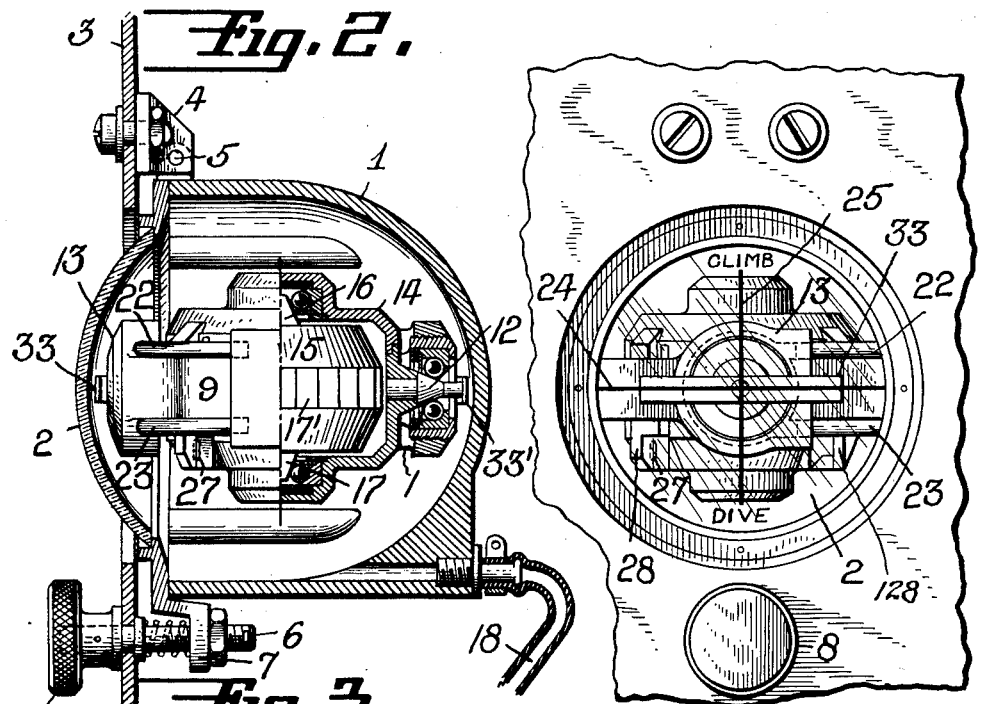
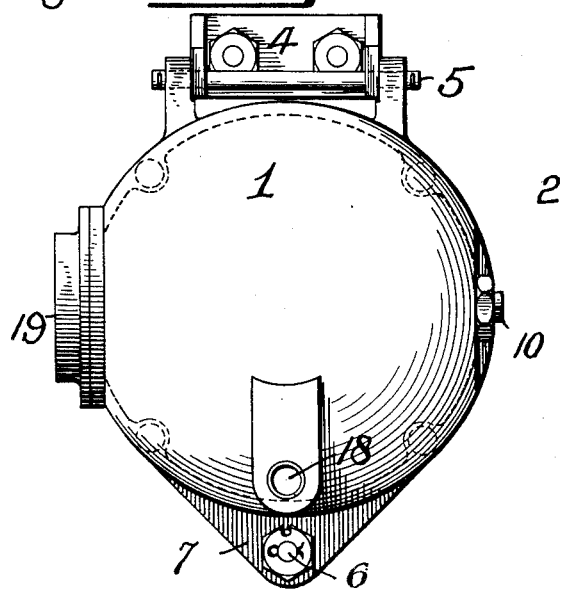
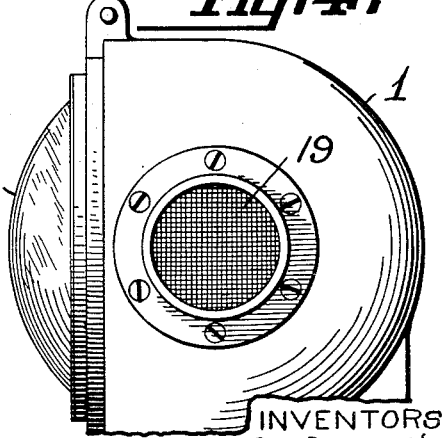
INVENTORS
Bert G. Carlson and
Frederick C. Narvesen.
BY
Herbert H. Thompson
their ATTORNEY.

Dec. 19, 1933. F. C. NARVESEN ET AL 1,939,825
GYROSCOPIC HORIZON INDICATOR
Filed April 2, 1931   2 Sheets-Sheet 2
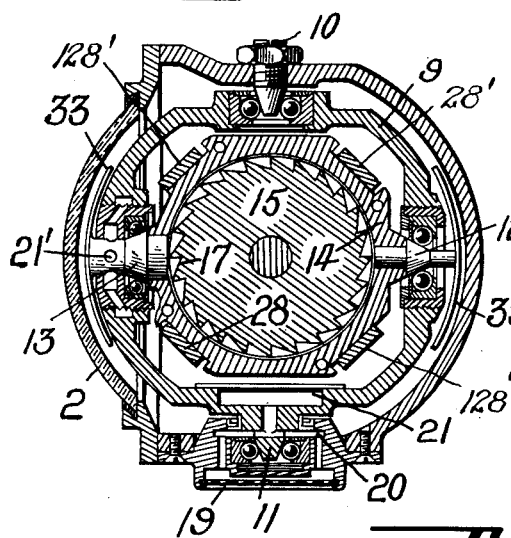
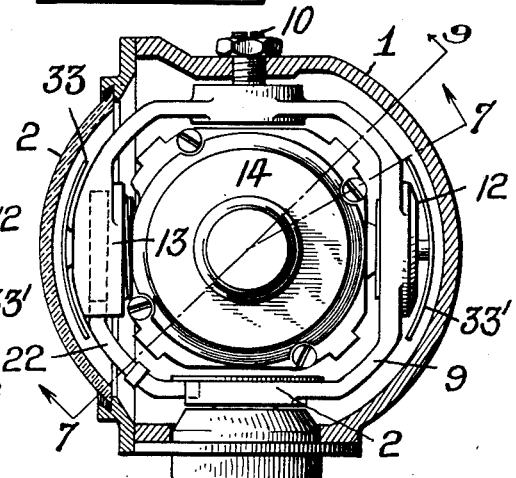
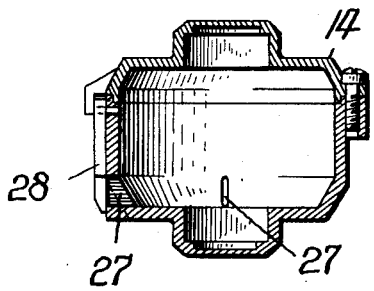
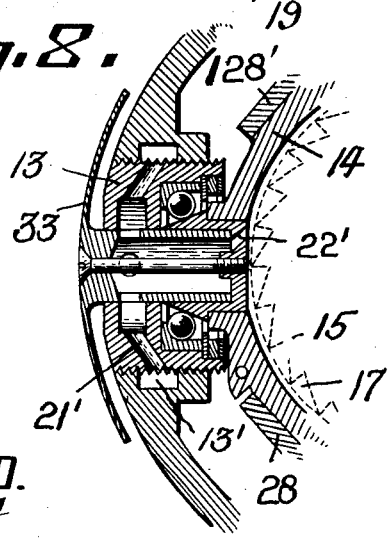
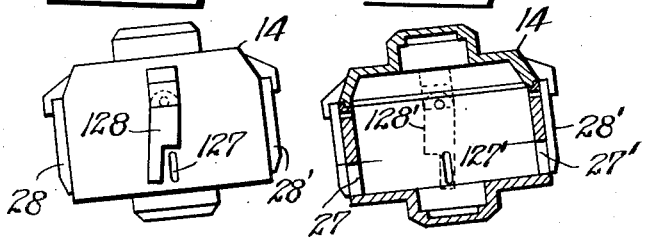
INVENTORS.
Bert G. Carlson and
Frederick C. Narvesen.
BY
Herbert H. Thompson
Their ATTORNEY Patented Dec. 19, 1933

1,939,825

UNITED STATES PATENT OFFICE 1,939,825

GYROSCOPIC HORIZON INDICATOR

Frederick C. Narvesen, East Rockaway, and Bert G. Carlson, Elmhurst, N. Y., assignors to Sperry Gyroscope Company, Inc., Brooklyn, N. Y., a corporation of New York Application April 2, 1931. Serial No. 527,220

5 Claims. (Cl. 33—204)

This invention relates to gyroscopic artificial horizons for aircraft, that is, gyroscopic indicators for showing the aviator the true horizontal in a manner to simulate the apparent movements of the real horizon, as he views the same from the cockpit.

One form of such instrument is shown in the copending application of Messrs. Preston R. Bassett and Elmer A. Sperry, Jr., Serial No. 365,460, filed on May 23, 1929, and assigned to the assignee of the present application. While this instrument is entirely satisfactory for ordinary flying, it was found that it could not be used for stunt flying because in vertical dives, looping the loop, and in barrel rolls the indicating member would strike the support and upset the gyroscope.

In the present invention we endeavor to retain the advantages of the prior invention by retaining a single indicating member to simulate the apparent movements of the real horizon and, at the same time, produce an instrument which will retain its usefulness even in stunt flying, including loops and barrel rolls.

For this purpose we place the universally mounted gyroscope with its major axis athwartship and its minor axis fore and aft, which is the opposite of the mounting used in the aforesaid prior application. We then place an indicating member on both minor trunnions so that each indicator will move up and down when the airplane pitches with the gimbal ring and will also tilt laterally with the apparent movements of the gyroscope when the airplane rolls.

By putting an indicator on each end of the instrument, that is, on the forward and rearward ends, the usefulness of the indicator is retained even though the plane may have turned clear around the gyroscope, so what was formerly the rear of the indicator is now facing the pilot. Also by this means there are no parts connected with the indicator which will strike when the plane turns around the gyroscope or, what amounts to the same thing, when the gyroscope is somersaulted.

Referring to the drawings in which a preferred form of the invention is shown,

Fig. 1 is a front elevation of our artificial horizon as mounted on the instrument board of the aircraft.

Fig. 2 is a vertical section through the same, parts of the gyroscope being shown in elevation.

Fig. 3 is the rear elevation.

Fig. 4 is a side elevation of the casing showing the air intake.

Fig. 5 is a horizontal section through the trunnion axes of the gyroscope.

Fig. 6 is a plan view of the gyroscope, the outer casing being shown in section.

Fig. 7 is a vertical section through the gyro casing on broken line 7—7 of Fig. 6.

Fig. 8 is an enlarged transverse section of the hollow trunnion through which the spinning air is brought to the nozzle.

Fig. 9 is a side elevation of the gyro casing looking in the direction of the lower arrow 7 in Fig. 6, the gyro casing being shown as inclined at a slight angle to show the relative position of the air port and adjacent blade.

Fig. 10 is a sectional view of the gyro casing taken on broken line 7—9 of Fig. 6 looking in the direction of the arrows, the gyroscope being shown in the same position as in Fig. 9.

The gyroscope is preferably housed in a casing 1 which has its forward end closed by a glass cover 2 through which the gyroscope is visible, as shown in Fig. 1. The case may be secured to the instrument panel 3 as by means of bracket 4 bolted to the instrument panel from which the casing is pivotally hinged by pin 5. A single clamp screw 6 is provided to secure the lower end of the casing to the instrument panel. This screw passes through a lug 7 on the bottom of the casing and is adjustable by the thumb nut 8 so that the casing may be placed in an exactly vertical position on the panel even though the panel may not be exactly plumb.

The gyroscope is universally mounted within the casing, preferably by means of the usual gimbal mounting. We prefer, however, to mount the gimbal ring 9 with its major, or outer, axis 10—11 athwartship on the plane. The gyroscope is thus supported on the minor axis 12—13 within the gimbal which normally lies fore and aft on the aircraft. The gyro rotor is shown as completely enclosed within a casing 14. Within the casing the rotor 15 is journaled for spinning about the vertical axis in bearings 16—17.

Preferably, the gyroscope is of the air spun variety. For this purpose the rotor may be provided with blades or buckets 17'. For supplying the driving air to the rotor and at the same time retaining the completely universal mounting, we prefer to lead the air in through the trunnion axes. In the form of the invention shown, the gyroscope is driven by atmospheric instead of super-atmospheric pressure. For this purpose the casing is exhausted of air through a pipe 18 connected to a vacuum pump, such as a Venturi tube, on the airplane. The atmospheric air enters the casing through screened aperture 19 from whence it passes through channel 20 and through a hollow trunnion 11 into space 21 with which two pipes 22—23 are connected. Said pipes lead along the gimbal ring 9 into the interior of the bearing 13'. From thence the air is led through aperture 21' into hollow trunnion 13 (see Fig. 8). This leads directly to the nozzle 22' which drives the gyro wheel.

In order to provide a completely universal mounting for the indicator as well as the gyroscope the horizon indicator proper 33 is mounted directly on the hollow trunnion 13. It will also be seen that by putting the indicator 33 on the minor trunnion 13 that it will also indicate pitch (climb or dive) of the plane as well as roll (bank). The indicator may be in the form of a horizontal bar which is read in connection with the normally horizontal index or mark 24 on the glass cover 2. If desired, a vertical mark 25 may also be used which intersects the horizontal mark 24 at the center of oscillation of the gyroscope when the airplane is horizontal. The words "climb" and "dive" may also be placed on the housing so that the aviator may be sure that when the bar 33 apparently moves up above the reference mark 24 that the plane is climbing and when it goes down below the mark 24 the plane is diving. To the aviator, therefore, line 24 represents the horizon and bar 33, a part of the plane, which is the opposite of the prior application referred to above.

If the instrument so far described were used in a complete loop, i. e., the plane turned completely around the gyroscope in a loop, the rear end of the gyroscope would then be adjacent to the cover 2 and the indicator 33 would be hidden and useless. In order that the gyroscope may be still used as a horizon indicator without resetting, we also place a similar horizon indicator bar 33' on the rear end of the gyroscope so that the indicator may continue to be used under such conditions.

As before stated, the gyroscope is preferably universally mounted in substantially neutral equilibrium and depends upon an erecting device for bringing the gyroscope back to the vertical in case it should become displaced. For this purpose we permit the air from the casing to escape through small circumferentially spaced slots or apertures 27, 27', 127, 127' which may be placed in the main body of the casing to one side, that is, slightly above or below the trunnion case. As shown, the apertures are placed below the trunnion case and pivoted adjacent to each aperture is a small pendulum 28, 28', 128, 128' having a knife-edge which normally lies adjacent and preferably partially closes each aperture. As shown, four apertures and four pendulums are used spaced 90 degrees apart and placed in this particular construction midway between the trunnions. It can readily be seen that when the gyroscope tilts in the plane of the pendulum that the ports adjacent opposite pendulums will be closed on one side and opened wider on the other as shown in Fig. 9 so that the air reaction therefrom is increased on one side of the gyroscope and decreased on the opposite side. A torque is, therefore, exerted about the horizontal case of the gyroscope at right angles to the action of inclination which directly reduces the tilt without setting up an oscillation. The broader aspects of this erecting device, however, are not claimed herein but in the copending application of Bert G. Carlson, one of the joint inventors hereof, Serial No. 514,737, filed February 10, 1931, for Air driven gyro verticals.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An artificial horizon for aircraft comprising a support, a gimbal mounting, a gyroscope universally pivoted therein for oscillation about horizontal major and minor trunnion axes and spinning about a vertical axis, with its minor trunnions fore and aft on the craft, a stationary index on said casing and a horizon indicator secured to at least one of said minor trunnions to move with the gyroscope about both axes and readable on said index whereby said indicator apparently moves up and down with the gimbal ring on pitching of the craft and is apparently tilted with the gyroscope on rolling of the craft.

2. An artificial horizon for aircraft comprising a support, a gimbal mounting, a gyroscope universally pivoted therein for oscillation about horizontal major and minor trunnion axes and spinning about a vertical axis, with its minor trunnions fore and aft on the craft, a stationary index on said casing, and a horizon indicator secured to both of said minor trunnions to move with the gyroscope about both axes, one of which indicators is always readable on said index, whereby the horizon remains operative without resetting during stunt flying.

3. An artificial horizon for aircraft comprising a support, a gimbal mounting, a gyroscope universally pivoted therein for oscillation about horizontal major and minor trunnion axes, with its minor trunnions fore and aft on the craft, air means for spinning the gyroscope on a vertical spinning axis, means for leading the driving air in through the trunnions, a stationary index on the front of said casing, and a horizon indicator secured to both of said minor trunnions to move with the gyroscope about both axes, one of which indicators is always readable upon said index whereby the horizon remains operative without resetting during stunt flying.

4. In a gyro vertical, a rotor, a closed casing therefor, means for mounting the same in substantially neutral equilibrium, air blast means for spinning the rotor, a plurality of small spaced apertures around the periphery of said casing adjacent the rotor and through which the driving air escapes, and a pendulous shutter pivoted above each aperture and adapted to vary the opening of the adjacent aperture on inclination of the gyroscope in the plane of the shutter.

5. In a gyro vertical, a rotor, a closed casing therefor, means for mounting the same in substantially neutral equilibrium about two axes with the spinning axis normally vertical, air blast means for spinning the rotor, four small equally spaced apertures around the periphery of said casing below the axes of support and through which the driving air escapes, and a pendulous shutter pivoted above each aperture and above said supporting axes and adapted to vary oppositely the opening of opposite apertures on inclination of the gyroscope in the plane of the shutters.

BERT G. CARLSON.
FREDERICK C. NARVESEN.